Feb. 18, 1969     G. GEDDES, SR., ET AL     3,428,294

ROTARY VALVE FAUCET

Filed Dec. 27, 1966

United States Patent Office 3,428,294
Patented Feb. 18, 1969

3,428,294
ROTARY VALVE FAUCET
George Geddes, Sr., and Jennie Geddes Kay, both of 3544 E. Burly, Orange, Calif. 92667
Filed Dec. 27, 1966, Ser. No. 604,905
U.S. Cl. 251—182                 6 Claims
Int. Cl. F16k *31/50, 5/04, 17/04*

ABSTRACT OF THE DISCLOSURE

A valve that includes a cylindrical chamber, within which is rotatable a cylindrical valve member having at least one side opening and an axial opening, and stem extending through the axial opening and rotatable with the split valve member, the stem having an axial opening and a side opening registering with the side opening in the split valve member. A spring forces the sections of the split valve member apart to assist in forming a seal along the wall of the valve chamber.

---

Figure 1:
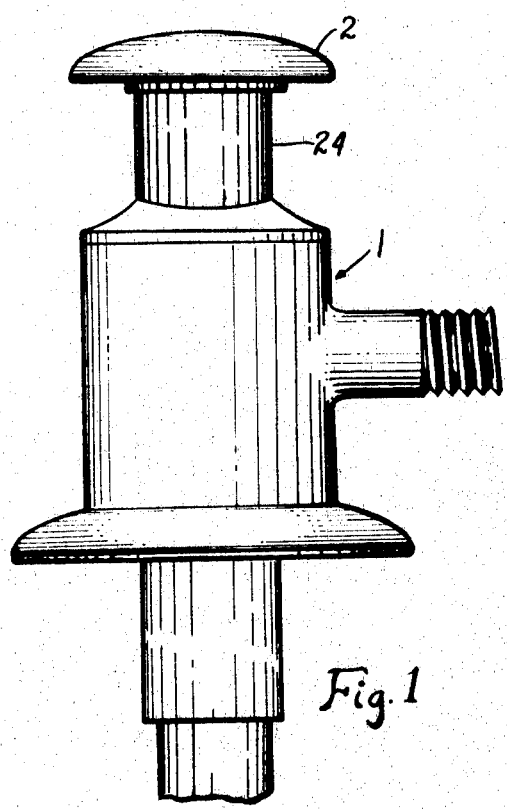

This invention relates generally to rotary valve faucets and more particularly to such valves wherein a metal-to-metal seal constitutes the sealing mechanism of the valve.

Conventional fluid-carrying valves, such as household faucets, generally employ a rotary valve connected to a screw-threaded plunger with a handle. Thus, when the handle is rotated counterclockwise it moves the valve upward, unseating the valve from its seat and opening the faucet to allow the passage of water or the liquid therethrough. When the handle is rotated clockwise, the valve body moves downward and abuts against a valve seat whereby the faucet closes, shutting off the flow of liquid through the faucet. However, the bottom part of the valve invariably contains a rubber or leather gasket to form a seal between the seat and the valve body. The gasket then receives a pressure and a release, as the valve closes and opens, respectively. This action causes the gasket to wear out in time and leakage of the liquid through the valve results, whereupon the faucet has to be disassembled, the old gasket has to be replaced, and then the faucet reassembled. This is a cumersome, time-consuming, and somewhat costly operation.

To eliminate these difficulties and for further advantages as hereinafter will be evident from the description of the invention, the present invention includes a split-cylinder metallic valve which offers a leakproof and effective operation during the long service life of the device. Once the faucet is installed on the water or other liquid system, it requires no additional adjustments or repair.

Therefore, for its principal object, the faucet embodies a split-cylinder valve having a cubical chamber therein including a spring disposed in tension so as to exert a constant force upon said cylinder halves diagonally thereof to sustain a hermetically sealed valve position.

A further object of the invention is to provide a cubical collar or bushing formed on a tubular member with one end attached to the handle of the faucet and the other end passing through said split-cylinder valve, with said cubical collar disposed in the chamber thereof for permitting rotation of said valve.

Another object of the invention is to provide said cubical collar with oppositely positioned apertures opening into said tubular member, whereby liquid intake through one hole is allowed to flow through said tubular member disposed at right angles thereto.

A still further object of the invention is the ability thereof to turn on and off the liquid therethrough by a mere rotation of the handle a 90-degree clockwise or counterclockwise direction from the stationary position of the valve.

Still another object of the invention is the provision of inlet and outlet ports which are adapted to be easily installed on any plumbing line, using ordinary tools generally available in a household.

Figure 2:
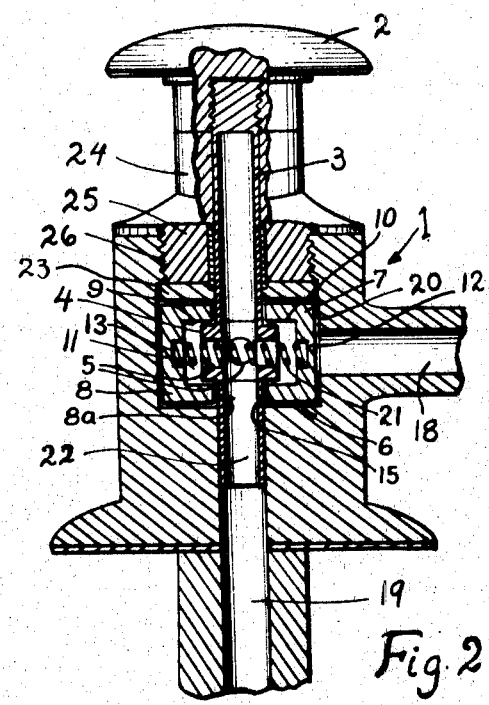
Figure 3:
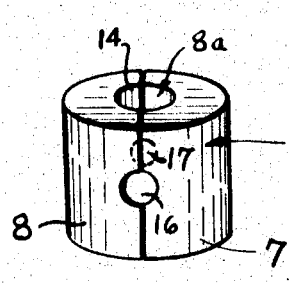
Figure 5:
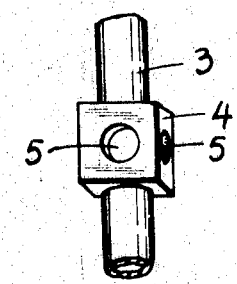
Figure 4:
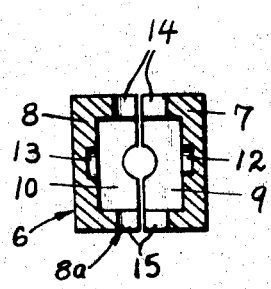

Other objects and advantages of the invention will become more apparent from the following description of the invention and the accompanying drawing, in which:

FIGURE 1 is a perspective view of the rotary-valve faucet embodying the present invention, FIGURE 2 is a partial axial section of the invention shown in FIGURE 1, FIGURE 3 is a perspective view of the split-cylinder valve body, FIGURE 4 is an axial section of the split-cylinder valve shown in FIGURE 3, and FIGURE 5 is the plan view of the cubical collar permanently secured around the tube member which is attached to the faucet handle for rotating the split-cylinder clockwise or coutnerclockwise to operate the faucet.

Referring now to the drawing, numeral 1 is the faucet housing made of metal, such as bronze or steel, and having a cylindrical chamber therein and at its upper end a handle 2 connected by screw attachment to a cylindrical tubing member 3, which is integral with a cubical collar or bushing 4 having diametrically opposite apertures 5 formed in the lateral walls thereof and extending to tubing 3 having corresponding apertures in register with said apertures 5. A valve body 6 with an axial bore 8a extending therethrough is disposed in the cylindrical chamber 20.

Each of the cylinders 7 and 8 is provided internally thereof with a quadrangular recess 9 and 10, respectively. When the half cylinders 7 and 8 are placed together so that said recesses 9 and 10 are oppositely disposed, a quadrangular or cubical chamber 11 is formed in said valve body 6. Each of the quadrangular recesses 9 and 10 is provided with a shallow- and round-bottomed recess 12 and 13, respectively. The valve body 6 is further provided with circular apertures 14 and 15 formed axially thereof, the tubular member 3 passing through the apertures 14 and 15, with said cubical collar being accommodated in chamber 11. Two diametrically opposite circular apertures 16 and 17 are also provided at the midpoint in the wall of the valve 6, each half of each aperture being formed on the respective half cylinder so that when said half cylinders are put together the half apertures register to form a complete hole; one of the apertures, aperture 16, being slightly larger than aperture 17.

The faucet housing 1 is further provided with an inlet port 18 and an outlet port 19 disposed at right angles to the inlet port 18. The inlet and outlet ports meet in the valve body 6 when the latter is in open position, in which event either aperture 16 or 17 is in register with the inlet port. This position of the valve permits the liquid to flow from the inlet port 18, through aperture, for instance, 16, aperture 5 of collar 4, into the tubing 3 and therefrom into the outlet port 19, from which the liquid is dispensed, although the reverse of the process is also possible, depending on the manner of connection of the faucet.

To assemble the valve, a coil spring 21 is inserted into the aperture 5 of the cubical bushing 4 and the two half cylinders 7 and 8 are placed around the bushing 4 to enclose it therebetween. The ends of the spring 21 then normally slip into the recesses 12 and 13, thus exerting an outward pressure on the half cylinders 7 and 8 and tending to push them apart. The purpose of the spring 18 is to maintain a constant tension on the half cylinders 7 and 8 to keep them apart and thus seal the inlet port 18 when the faucet is closed.

The valve body 6 is assembled with the cubical bushing 4 and the spring 21 being first inserted into the faucet housing 1 so that the valve body 6 seats at the bottom of chamber 20, with the elongated portion 22 of tubing 3 extending into the upper portion of outlet port 19. A gasket or washer 23 made of any suitable material, such as plastic, rubber, or metal, is inserted over the upper portion of tubing 3 and an axially bored collar 24 having an externally screw-threaded section 25 thereon is attached to the housing 1 to the internally threaded portion 26 thereof until the valve body 6 is snugly seated in chamber 20 but easily rotatable clockwise or counterclockwise, because of the proper thickness of washer 23. The half cylinders 7 and 8 then make an intimate contact with the peripheral wall of the chamber 20, due to spring 21 action thereupon, forming a hermetic seal between the inlet and outlet ports 18 and 19.

For operation, the rotary-valve faucet is connected in a plumbing line carrying a liquid, such as water, by connecting the inlet and outlet threaded sections formed on the ports 18 and 19 to the line. The liquid may be transmitted through the valve by opening the valve with a 90-degree rotation of the handle either clockwise or counterclockwise. Since there are two sizes of apertures in the valve body, the aperture 16 and aperture 17, which latter is smaller than the aperture 16, the quantity of water passing through the valve may thus be controlled by turning either the larger or the smaller aperture toward the inlet port 18 of the valve. For larger quantity of flow, the valve body 6 is rotated so that the aperture 16 is in register with the inlet port 18; for smaller quantities of flow, the valve body 6 is turned so that the aperture 17 is in register with the inlet port 18. For intermediate amounts of liquid flow, the valve body 6 is rotated slightly so as to obtain the required amount of flow from the valve.

It will thus be seen that while the invention discloses a valve construction in which only a single source of incoming liquid is illustrated, the valve may be easily adapted for two inlet ports, for instance, one for cold water and a second one for hot water. In such an event the two flow through the valve mix in the valve body 6 before passing out through the outlet port 19, which then will form the dispensing terminal of the faucet.

The foregoing description of the invention defines only the principle of construction and operation of a preferred embodiment of the invention and, as described in the preceding section, the valve may be adapted to function as a double-inlet port device wherein additional channels or ports may be attached thereto, such as hot and cold water ports.

We claim:

1. A rotary valve faucet, comprising a cylindrical housing having an axial bore therethrough and provided with inlet and outlet ports disposed therein and extending to said axial bore, a chamber formed between said inlet and outlet ports within said axial bore, the outlet port forming a part of said bore, a rotary-plug valve having a bore therethrough and axially thereof being disposed in said chamber in communication with said inlet and outlet ports in said chamber therein to control the passage of liquid from said inlet port to said outlet port, a handle disposed at one end of said housing axially thereof, a tubular member secured at one end to said handle and at the other end extending through said axial bore of said housing and said bore of said rotary-plug valve and passing therethrough to extend into the outlet port; said rotary-plug valve being formed of two half cylinders with a quadrangular chamber formed therebetween, apertures formed in the walls of said half cylinders to communicate with said inlet and outlet ports, resilient means disposed in the chamber of said rotary-plug valve and adapted to exert an outward force on said cylinder halves and diagonally thereof to sustain them apart and thereby to create a hermetic seal between the wall of said chamber located between the inlet and outlet ports when said rotary-plug valve is in closed position; when said rotary-plug valve is in open position by rotation thereof 90 degrees with respect to the closed position, one of said apertures formed in the walls of said half cylinders being in register with the bore of said inlet port to permit the passage of liquid from said inlet port into said rotary-plug valve through the apertures in the wall thereof, and into the outlet port through the terminal end of said tubular member extending thereinto.

2. A rotary valve faucet as defined in claim 1, wherein the portion of said tubular member located in the quadrangular chamber of said rotary-plug valve having a plurality of apertures disposed in quadrature thereof and a cubical collar being secured to said portion of said tubular member and having apertures in register with the apertures of said tubular member; said cubical collar being adapted to be accommodated within the quadrangular chamber of said rotary-valve for rotating said valve during operation of said faucet.

3. A rotary valve faucet as defined in claim 1, wherein said resilient means being a coil spring and located in the diagonally oppositely formed apertures of said cubical collar and extending to said half cylinders to exert a diagonally outward pressure thereupon.

4. A rotary valve faucet as defined in claim 3, wherein each of said half cylinders having in the middle section thereof a round-bottomed shallow recess disposed diagonally opposite to the respective recess on the other half cylinder, and the terminal ends of said coil spring being positioned in said recesses.

5. A rotary valve faucet as defined in claim 1, wherein said axial bore extending through said housing being cylindrical and larger in diameter at one end than at the other end, said rotary-plug valve being positioned in the larger-diameter bore, a gasket inserted over said tubular member and upon said valve, and a collar positioned between said handle of the faucet and said rotary-plug valve being secured to said housing by screw attachment and further being disposed over said gasket to hermetically seal said rotary-plug valve therein.

6. A rotary valve faucet as defined in claim 1, wherein said inlet and outlet ports being disposed at right angles to each other within said faucet housing.

References Cited

UNITED STATES PATENTS

| 104,746 | 6/1870 | Leckenby | 251—310 |
| 1,160,342 | 11/1915 | Taft | 251—310 XR |
| 2,566,071 | 8/1951 | Schobert | 251—182 |
| 3,239,190 | 3/1966 | Mayo | 251—214 XR |

HAROLD W. WEAKLEY, Primary Examiner.

U.S. Cl. X.R.

251—214, 310